United States Patent
Alhadad et al.

(10) Patent No.: US 7,400,718 B2
(45) Date of Patent: Jul. 15, 2008

(54) AUTOMATED BUSINESS FORM INFORMATION AQUISITION SYSTEM

(75) Inventors: Syed Abdulkader El Shariff Bin Mohamed Alhadad, Indialantic, FL (US); Susan Wagner, Riverwoods, IL (US)

(73) Assignee: Golden Voice Technology & Training LLC, Highland Park, IL (US)

( * ) Notice: Subject to any disclaimer, the term of this patent is extended or adjusted under 35 U.S.C. 154(b) by 856 days.

(21) Appl. No.: 09/990,871

(22) Filed: Nov. 16, 2001

(65) Prior Publication Data

US 2002/0090062 A1   Jul. 11, 2002

Related U.S. Application Data

(63) Continuation-in-part of application No. 09/645,920, filed on Aug. 24, 2000.

(60) Provisional application No. 60/252,033, filed on Nov. 20, 2000.

(51) Int. Cl.
*H04M 5/00* (2006.01)
(52) U.S. Cl. .............................. 379/265.07; 379/88.18; 379/266.07; 705/40; 707/1
(58) Field of Classification Search ............... 379/67.1, 379/88.12, 88.17, 88.18, 265.01–266.1, 214.01, 379/88.01, 88.09; 707/1; 705/40
See application file for complete search history.

(56) References Cited

U.S. PATENT DOCUMENTS

| | | | |
|---|---|---|---|
| 4,918,322 A | 4/1990 | Winter et al. | 379/88 |
| 5,283,731 A | 2/1994 | Lalonde et al. | 364/401 |
| 5,511,112 A | 4/1996 | Szlam | 379/88 |
| 5,684,870 A | 11/1997 | Maloney et al. | 379/212 |
| RE35,758 E | 3/1998 | Winter et al. | 379/88 |
| 5,774,887 A * | 6/1998 | Wolff et al. | 707/1 |
| 5,812,638 A * | 9/1998 | Muller | 379/88.09 |
| 5,848,143 A | 12/1998 | Andrews et al. | 379/219 |
| 5,889,518 A | 3/1999 | Poreh et al. | 345/340 |
| 5,903,269 A | 5/1999 | Poreh et al. | 345/346 |
| 5,913,195 A * | 6/1999 | Weeren et al. | 704/270 |
| 5,946,386 A * | 8/1999 | Rogers et al. | 379/265.09 |
| 6,040,832 A | 3/2000 | Poreh et al. | 345/340 |
| 6,216,111 B1 * | 4/2001 | Walker et al. | 705/14 |
| 6,222,542 B1 | 4/2001 | Poreh et al. | 345/346 |
| 6,606,373 B1 * | 8/2003 | Martin | 379/88.01 |
| 7,006,607 B2 * | 2/2006 | Garcia | 379/88.18 |
| 7,016,485 B2 * | 3/2006 | Shtivelman | 379/266.04 |

* cited by examiner

Primary Examiner—MD S Elahee
(74) Attorney, Agent, or Firm—Bell, Boyd & Lloyd LLP

(57) ABSTRACT

A computer workstation-associated call handler uses hooking and sub-classing techniques to modify actions executed by an underlying call handler application program to automatically trigger various call handler actions. These actions may include playback of pre-recorded personal response type phrases or other pre-defined actions at various instances during a call, in response to the call agent's interactions with personalized response system-based, and forms-based software in the course of servicing telephone calls. This obviates the need to change the source code of the target application.

29 Claims, 14 Drawing Sheets

| ID | LOGIN | NAME | GENDER | PHONE | TBA |
|---|---|---|---|---|---|
| 1 | DESIGNER | SHARIFF HADDAD | MALE | 2590854 | 0 |
| 2 | ADMINISTRATOR | JEREMY MATTHEWS | MALE | 2590854 | 0 |
| 3 | SUPERVISOR | DEMO SUPERVISOR | FEMALE | MALE | 0 |
| 4 | AGENT | DEMO AGENT | FEMALE | 2590854 | 0 |
| 30 | GERRY | | FEMALE | FEMALE | 0 |
| 31 | DEBBIE | | FEMALE | FEMALE | 0 |
| 32 | LEIGHANN | | FEMALE | FEMALE | 0 |

*FIG. 20.*

USERS — SAVE, CANCEL, FIRST, PREVIOUS, NEXT, LAST, ADD, DELETE, UPDATE

USER INFO | ACCESS RIGHTS

| LOGIN: | ADMINISTRATOR | USERID: | 2 |
| PASSWORD: | GOLDEN | | |
| NAME: | JEREMY MATTHEWS | | |
| PHONE: | 2590854 | | |
| GENDER: | MALE | | |
| TO BE APPROVED Ph: | | | |
| ROLE: | ADMINISTRATOR | | |
| REPORTS TO: | 0 | | |

RECORD 2 OF 7

AUTOMATED BUSINESS FORM INFORMATION AQUISITION SYSTEM

CROSS-REFERENCE TO RELATED APPLICATIONS

The present application is a continuation-in-part of co-pending U.S. patent application Ser. No. 09/645,920 (hereinafter referred to as the '920 application), filed Aug. 24, 2000, by S. Alhadad et al, entitled: "Automated Business Form Information Acquisition System," and further claims the benefit of co-pending U.S. application Ser. No. 60/252,033, filed Nov. 20, 2000, by S. Alhadad et al, entitled: "Automated Business Form Information Acquisition System," each application being assigned to the assignee of the present application and the disclosures of which are incorporated herein.

FIELD OF THE INVENTION

The present invention relates in general to communication systems and components therefor, and is particularly directed to an enhanced computer workstation-associated call handling mechanism (which may be termed a 'Frequently Asked Question Software' (or FAQsoft)-based mechanism), for use by call handling agents employing a personalized response system (PRS)-based, and Forms-Based (target) software such as Customer Relationship Management (CRM) software in the course of servicing inbound or outbound telephone calls. The present invention is operative to automatically trigger actions, such as the automatic playback of one or more prerecorded PRS phrases or other pre-defined actions at appropriate junctures during a call, in response to the call agent's interactions (via mouse or keyboard) with the target software. The phrases may include repetitive questions that are directly related to acquiring information from the client (the party calling or being called) for data entry into the software, or transmissions of required information to the client.

BACKGROUND OF THE INVENTION

As described in the above-referenced '920 application, substantially all service facilities that are accessible by a telecommunication link, such as but not limited to a phone line, steer incoming calls to a computer workstation that is attended by an individual typically known as a call handler. Running on the workstation or an associated server is one or more application programs used by the call handler, call agent, operator and the like (hereafter referred to simply as a call handler), to process calls in a manner that is efficient and satisfying to the calling party.

As a non-limiting example, in the case of a catalog order center, a 'target' application program will typically graphically display an order or business 'form' on the call handler's terminal display. The displayed form contains respective information fields, through which the call handler sequentially 'tabs' and which are filled in by the call handler, based upon answers to a series of questions (such as name, address, phone number, item number, quantity, etc.), which the call handler speaks to the calling party. Because this repeated interactivity on the part of the call handler for multiple calls tends to be monotonous, and labor intensive, adversely affecting call handling efficiency, call handling facilities are continuously seeking schemes that will allow as much of the call handler's workload as possible to be automated.

One scheme that has enjoyed widespread usage throughout the telecommunication industry for providing relief for a call handler or operator servicing incoming calls at an operator position is embodied in a device known as a 'personalized response system', and is the subject of U.S. Pat. Nos. 4,697,282 and 4,623,761, assigned to the assignee of the present application and the disclosures of which are herein incorporated. In accordance with this personalized voice message retrieval and playback device, an operator will prerecord commonly used phrases in a controllably accessible voice message storage and retrieval (VMSAR) mechanism (hereinafter referred to as a VMSAR mechanism. These phrases are then available for playback to a calling party (and simultaneously heard by the operator via the operator's headset) in the course of the operator's handling of a call. Playback may occur automatically, in response to initial signaling information contained in the incoming call, or manually by the operator manually invoking one or more inputs to the playback device. Because the prerecorded voice messages are played back in the voice of the operator, the calling party proceeds through the call in a straightforward and expeditious manner, perceiving that it is always the operator who is speaking.

Although the patented VMSAR mechanism works very well for its originally intended usage, and in a limited scope of additional applications, it has been found that as the number of messages and degree of complexity of the operator's responsibilities increase, especially with the use of personal computer-based workstations running multiple windows-type programs, it becomes more difficult for the call handler to remember all the sets of keystrokes which access the various messages. While a list of keystroke combinations could be provided, having the operator look up which keystrokes are to be used would inherently delay the processing of the call. Even if the operator knows or can find what keystroke combination is to be used, there is the possibility of an incorrect or unintended key operation, which may cause either no message or the wrong message to be played back. Realistically, therefore, the call handler cannot be expected to remember and use more than a relatively small number of keystrokes before confusion becomes an inhibiting factor.

Pursuant to the invention disclosed in the '920 application, problems associated with conventional call handler workstations are effectively obviated by a call handler-interactive mechanism, that automatically triggers playback of selected voice messages that have been pre-recorded via a personalized response system-based voice message storage VMSAR mechanism, in response to a call handler performing a prescribed interaction, such as a tab keystroke or mouse click, with one or more elements, such as 'control objects' displayed on a GUI of the call handler's terminal. To provide voice communication connectivity with an external network, the workstation may be coupled to a private branch exchange (PBX) or switch. The PBX or switch is also coupled to the VMSAR mechanism through the voice terminal.

The GUI generated on the workstation display may comprise, for example, a 'windows' type user interface, generated by an underlying call handling application program that may be running on the workstation's computer or on a separate server. The GUI typically contains a plurality of fields, buttons, and the like, in which information may be keyboard entered by the call handler, in the course of servicing a call, such as one placed to a catalog order center. The '920 invention reduces the workload on the part of the call handler, by integrating with or into the target program software a GUI-associated, event-driven VMSAR mechanism.

The GUI is continuously monitored for the occurrence of prescribed events—corresponding to the call handler performing a prescribed interaction with a selected control object in the target program. As non-limiting examples, such GUI interaction may include placement of the display screen cursor arrow anywhere within the perimeter of the control object and a click of the 'left' mouse button, depression of the 'enter' key on the keyboard when a displayed reticle is placed upon a control object, operation of the 'tab' key that moves the cursor from object to object in the GUI, and the like.

When a desired event is raised, a digital (voice message playback) control message packet is generated, to specify a message number of a selected voice message to be played back by the VMSAR mechanism to the calling party. Each personalized voice message is predefined in accordance with the respective control objects of the displayed business form to be completed by the call handler. In large majority of instances, the phrases are brief questions that prompt the calling party to provide information to be entered into a particular field of the GUI.

In order to expedite the processing of a call, a respective control message packet is transmitted to the VMSAR mechanism immediately in response to a desired interaction of the call handler with a GUI control object. In a typical case, the control object of interest would be an empty information field, so that the VMSAR mechanism would be immediately triggered to generate the voice message associated with that field. However, the field of interest may already contain alpha-numeric text, such as may be obtained from calling ID capability of the telecommunication service provider, that has allowed the call handler application program to have already preliminarily entered text information in one or more fields prior to the call handler beginning a dialogue with the calling party. In this case, the call handler may simply confirm the accuracy of the filled-in information with the party. It will then be up to the call handler to either speak to the party, or interactively advance the cursor, for example, to the next empty field, which raises an event that triggers an associated voice message playback from the VMSAR mechanism.

In addition to triggering the playback of a prescribed voice message by the VMSAR mechanism, the '920 invention may also cause the words of that voice message to be displayed in a preselected dialogue/text box within the GUI, to confirm to the call handler that the intended message has been played back to the caller. A visual indication of the state of a control object may also be supplied, by means of a label, such a solid color region, placed immediately adjacent to the control object, to indicate the presence of an associated voice message. When the VMSAR mechanism is triggered, the background (e.g., color) of the label is changed, to indicate that the message has been played back. The label may then act as a button to be selectively triggered by the call handler.

SUMMARY OF THE INVENTION

As described briefly above, the present invention is directed to an enhanced computer workstation-associated call handling mechanism, that may be readily employed by a call handling agent to automatically trigger actions, such as but not limited to the automatic playback of one or more pre-recorded PRS phrases or other pre-defined actions at appropriate junctures during a call, in response to the call agent's interactions (via mouse or keyboard) with a personalized response system (PRS)-based, and Forms-Based (target) software such as Customer Relationship Management (CRM) software in the course of servicing inbound or outbound telephone calls.

Screen markers on the Graphical User Interface (GUI) elements of the Target software make the Call Agent aware of the GUI elements (e.g., field boxes, buttons, pictures, etc. otherwise known by one schooled in the art as controls) are associated with a pre-defined action (or series of actions) and have been enhanced by the invention. Variations in the screen markers represent different types of automated actions that manipulation of the GUI elements will execute.

The present invention also provides the ability to manually execute pre-defined actions (playback of PRS Phrases and other actions), as by operating specific keys or key combinations (Hotkeys) or mouse-clicking configurable buttons (FAQsoft Buttons) housed within a Windows Appbar application (FAQsoft Deskbar). The invention enables a Call Agent, Supervisor or other administrator to develop Responses (pre-defined single or multiple actions), associate the Responses to a Hotkey or FAQsoft Button, and trigger Responses using hotkeys or FAQsoft Buttons during the normal progress of a telephone call.

A fundamental aspect of the present invention is its ability to respond to user interactions with predefined GUI elements (Controls) in an existing Target Application, without having to modify the source code of the Target Software. Instead, hooking and sub-classing techniques made available in WinOS are employed to change the behavior and look of these Target Applications to provide a higher level of automation for Call Agents, without requiring any changes to the Target Application itself.

The present invention enhances existing software by providing automated playback of pre-recorded phrases; however, this action can be expanded to include any action the computer is capable of executing via the use of scripts. Screen Indicators (Markers) appear on Controls that have been configured for Responses.

BRIEF DESCRIPTION OF THE DRAWINGS

FIG. 20 shows a User Manager window with a list of users;

FIG. 21 shows a User Manager window with User Info;

FIG. 24 shows a normal Outlook Contact window before running the FAQsoft routine;

FIG. 25 shows an Outlook Contact window after being configured with FAQsoft and with FAQsoft running;

DETAILED DESCRIPTION

Figure 1:
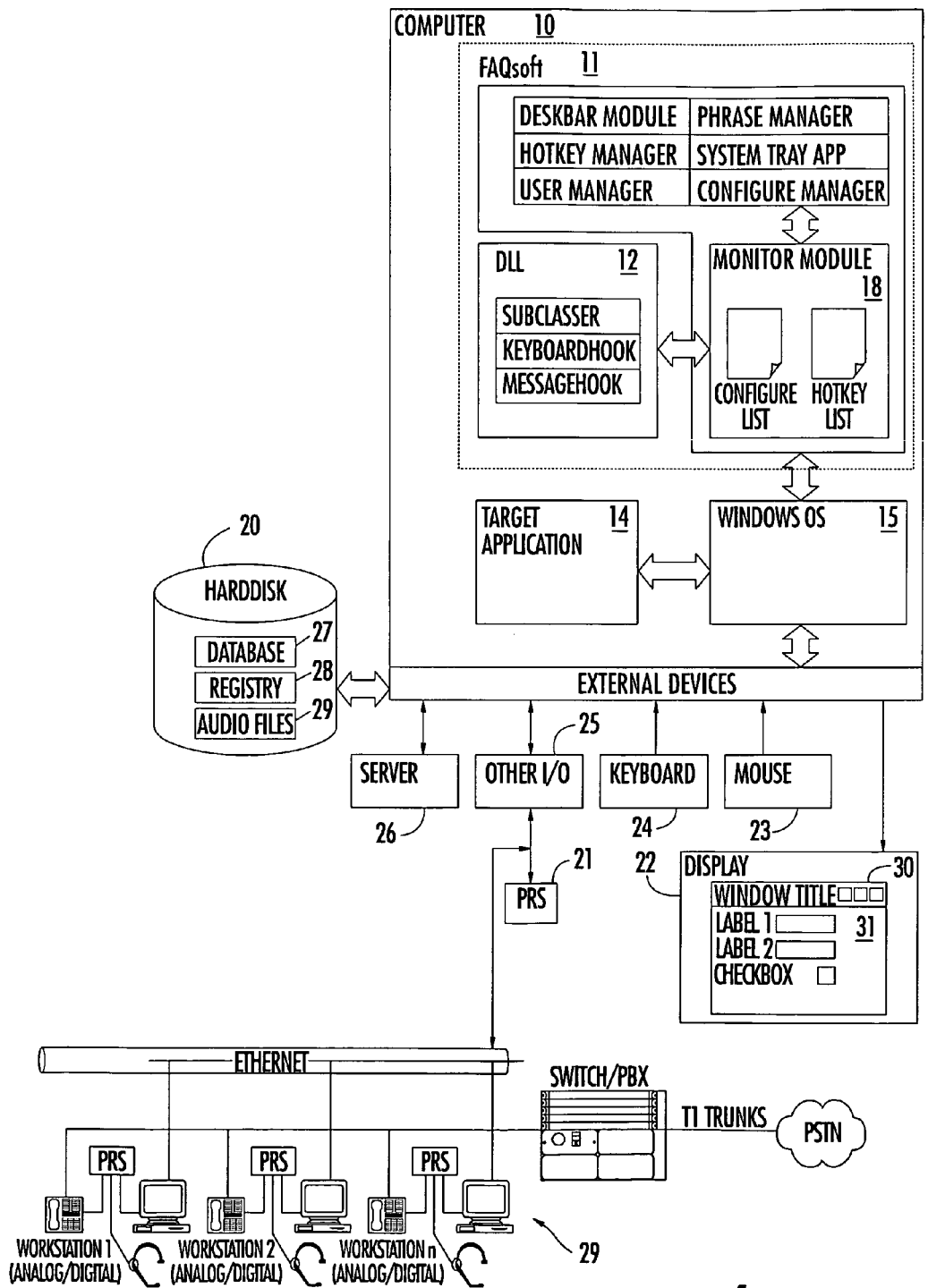
FIG. 1 is a block diagram of a computer-based call handler employing the FAQsoft mechanism of the invention.

Before describing in detail the automated business form information acquisition system of the present invention, it should be observed that the invention resides primarily in the augmentation of the software employed by the call handler's computer workstation, being operative to automatically trigger actions, such as the automatic playback of one or more pre-recorded PRS phrases or other pre-defined actions during a call, in response to the call agent's interactions (such as through a mouse click or keyboard action) with the target software. The phrases may include repetitive questions that are directly related to acquiring information from the party calling or being called for data entry into the software, or transmissions of required information to the client.

Consequently, the invention has been illustrated in the drawings in readily understandable block diagram, flow chart and associated GUI display format, which show only those specific details that are pertinent to the present invention, so as not to obscure the disclosure with details which will be readily apparent to those skilled in the art having the benefit of the description herein. Thus, the illustrations are primarily intended to illustrate the major components of the invention in a convenient functional grouping, whereby the present invention may be more readily understood.

Attention is initially directed to FIG. 1, which shows the main components of the FAQsoft mechanism of the invention. It is comprised of a Personal Computer (PC) 10 running Microsoft Windows Operating System OS (e.g., Win95 and later), but can also be implemented in similar event-based Graphical User Interface Operating Systems. The PC 10 is coupled to conventional input/output devices, such as a display device 22, a pointing device 23, a keyboard 24 and other ports 25. The system can include a server 26 to archive files of personalized voice recordings (Audio Files) and to store the FAQsoft database. It is connected to a PRS 21 via a port for data communications, or may be connected to the sound card I/O ports or other ports for voice communication with a telephone system 29.

The PC 10 is used to run Target Applications typically used in Call Centers for taking orders or collecting information from a client. A user interacts with the Target Application's Graphical User Interface (GUI) 30 using a keyboard and/or mouse or other input device. The GUIs may include several different types of windows. At the top level are windows that have title bars and are called Top Level Windows. Other GUI elements hosted by Top Level Windows are commonly referred to as Controls.

Controls may include a variety of different windows (e.g., Forms, Labels, Text boxes, Buttons, Check boxes and so on). All windows—Top Level windows and Controls—have procedures that define their behavior commonly referred to as Windows Procedures. Using the mouse 23 or keyboard 24, the User may interact with Controls and thereby cause the operating system 15 to generate messages (commands) directed at these Controls. The Target Application 14 responds according to its programmed Windows Procedures.

The FAQsoft mechanism 11 monitors messages sent to these Controls and modifies their behavior by substituting or appending another procedure to the Control's original Windows Procedure. Only Controls in applications that have been explicitly configured for FAQsoft monitoring will exhibit these added functionalities.

Data for FAQsoft resides in a FAQsoft Database 27, either in the local bard drive 20 or at a server computer 26. The database stores information mainly on Control/Response association, Phrases, Hotkeys and Users. Information stored for each User includes controls to monitor in the target application, which audio files of recorded phrases to use (only audio files created in that User's voice) Audio File directories and that User's Hotkeys List, Deskbar settings and User access rights.

Before describing the details of the methodology of the present invention, a number of programming tools will be reviewed in order to facilitate the detailed description of the invention to follow.

Figure 2:
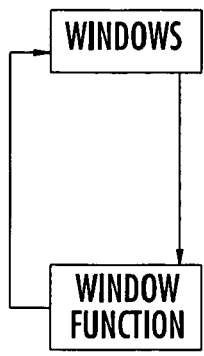
FIG. 2 shows a window programming tool.

Window (FIG. 2)

In an Event based GUIs Environment like Microsoft Windows, application screens are built using various 'windows', such as Edit box, Labels, Frames, Checkboxes, ComboBoxes and etc. These objects are actually windows with different styles and can be contained within other windows. Such windows are also known as 'Controls'. Windows that have a title bar are usually known as Top Level windows. Each window has a function to tell it how to behave when a user interacts with it. When a mouse pointer is clicked on a control, the OS sends a message to that control's windows function. Almost all interactions by the user with application software generate one or more messages that are queued within the OS message queue and are forwarded to the respective windows functions. The OS also provide tools (APIs) to allow programmers to trap these messages before they reach the intended windows function.

Figure 3:
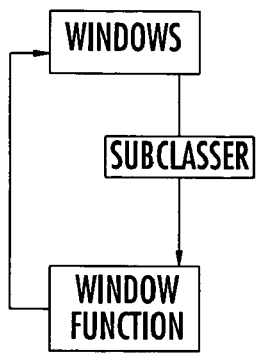
FIGS. 3 and 4 show SUBCLASSING programming tools.
Figure 4:
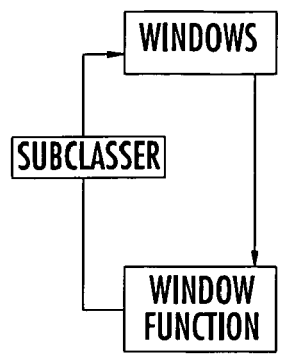

Subclassing (FIGS. 3 and 4)

Subclassing is based on the idea of intercepting messages by changing the function that is associated with a window, forcing messages going to a window to first execute the substituted code instead of the function originally assigned to a window. This provides the option of calling the original window function, if desired.

Subclassing can only handle one window at a time, so that it is necessary to individually subclass each window to be monitored. This is actually desirable for applications, such as FAQsoft, so that only messages of concern are received and only from controls of concern. This translates to less impact on overall system performance.

Figure 5:
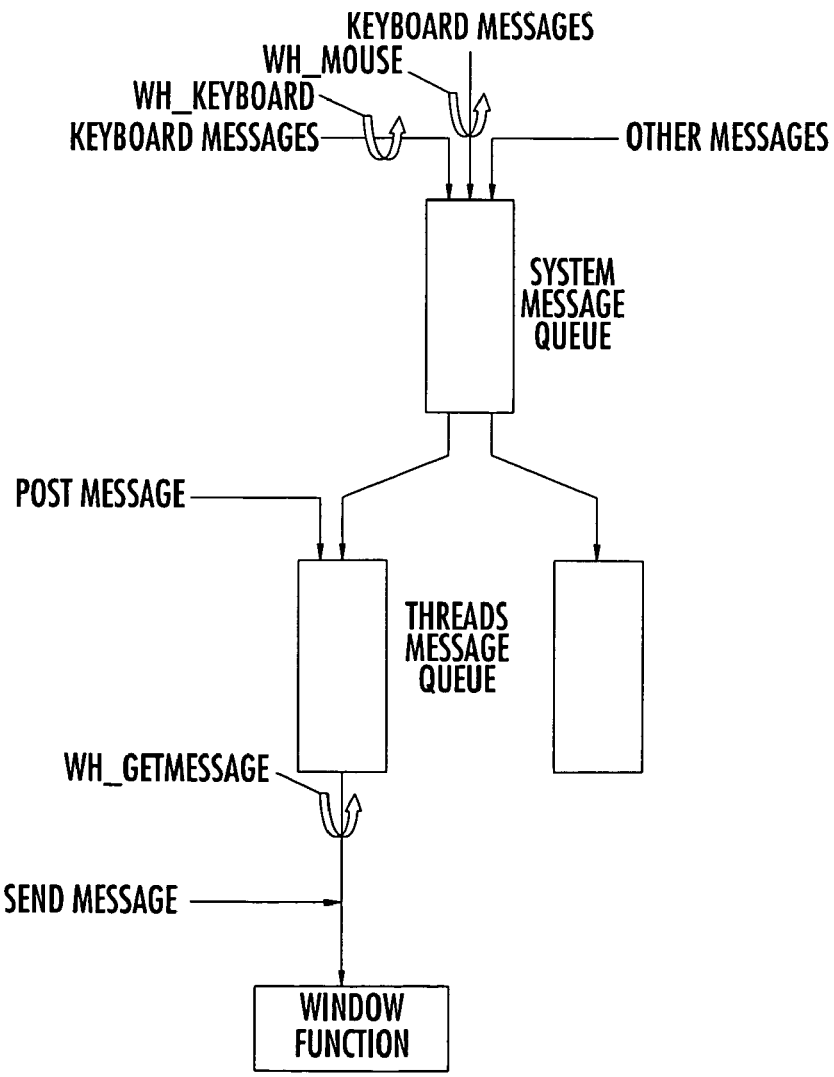
FIG. 5 shows a HOOKING programming tool.

Hooking (FIG. 5)

In order to view or interact with system wide messages, it is necessary to employ another technique call 'Hooking', which allows for system-wide or application-specific monitoring of events. The SetWindowsHookEx api contains special calls to trap and intercept mouse, keyboard and other system messages across all system process or specific process threads. FIG. 5 shows the WinOS message flow and some possible hook placements. A mouse hook WH_MOUSE is selectively placed to intercept a mouse message to a system message queue. A keyboard hook WH_KEYBOARD is selectively place to intercept a keyboard message to the system message queue. FIG. 5 also shows a WH_GETMESSAGE hook placed to intercept a message transmitted from a threads message queue to the window function.

The principal requirements of the FAQsoft mechanism of the invention are as follows:

Uniquely identify all GUI objects on a Forms based application (Target Application)

Draw and persist screen indicators on GUI elements controls on the target application to indicate that it is being monitored. (FAQsoft Enabled)

Associate one or more actions to take place when specific interactions is initiated by the User with these monitored GUI elements.

Respond to user manipulations or interactions with the selected GUI object by executing the actions defined previously.

Save the configuration for each target application so it may be recalled and used to accordingly.

Support monitoring a multiplicity of Target Programs concurrently.

Must not allow a perceivable degradation of system performance.

Provide Tools to associate Responses with GUI objects in Target Applications.

Figure 6:
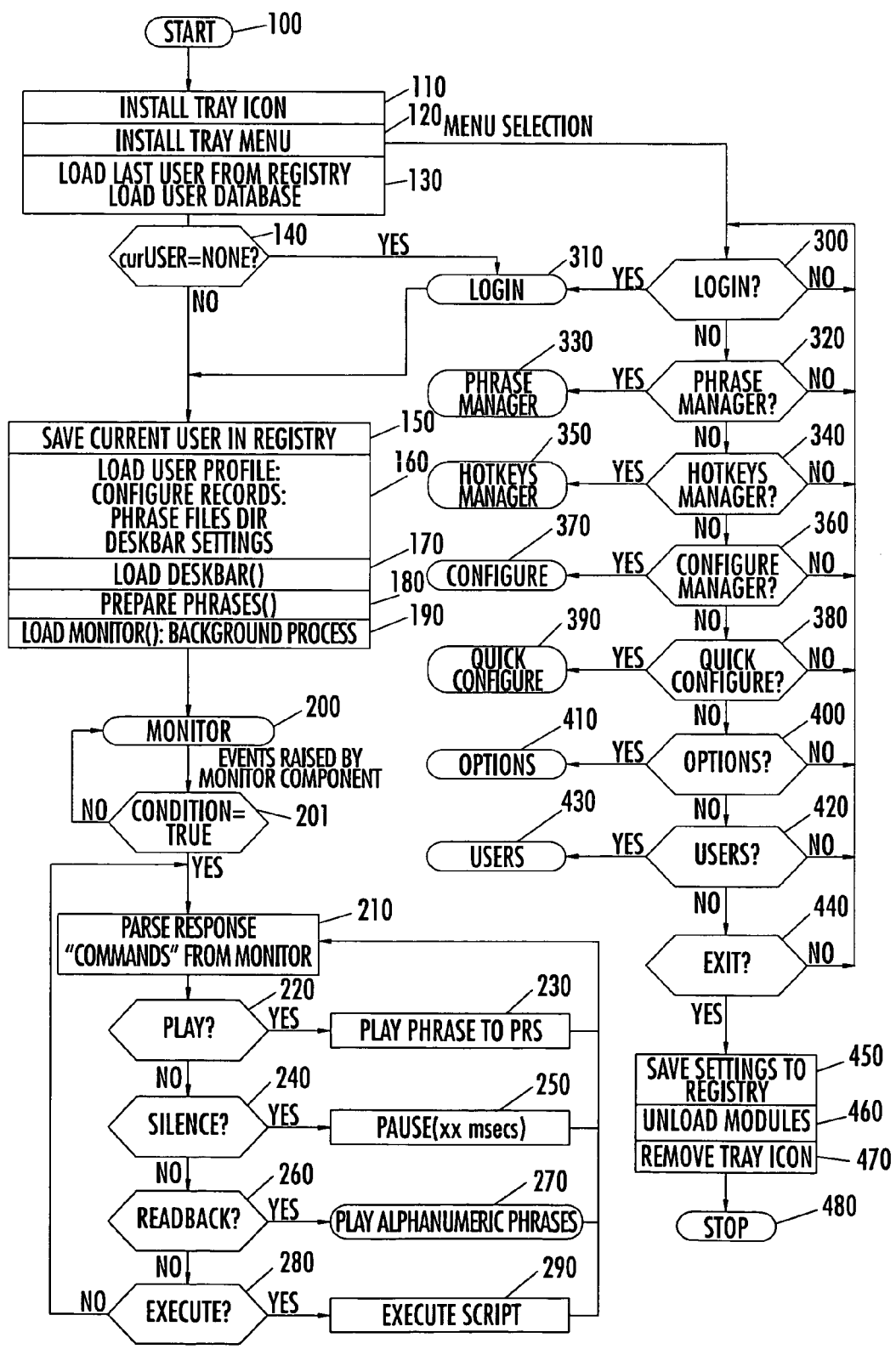
FIG. 6 is a flow chart showing the process of invoking and running the FAQsoft mechanism of the present invention.
Figure 7:
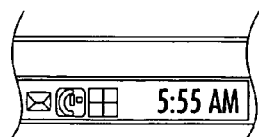
FIG. 7 depicts a FAQSoft Tray Application icon.

Attention is now directed to FIG. 6, which is a flow chart showing the process of invoking and running the FAQsoft mechanism of the present invention. FAQsoft is designed to run silently as a background process and will auto start when the computer is booted up. When FAQsoft is first started at step 100, it installs an icon into the system tray at step 110. System tray icons are icons that reside at the bottom right area of the desktop. They are usually reserved to represent applications that run in the background. FIG. 7 depicts the FAQSoft Tray Application icon White Quotes on Red in the system tray after it is installed by this step.

Figure 8:
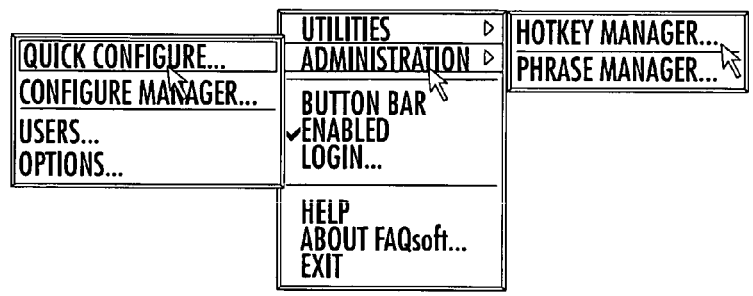
FIG. 8 shows a Tray Menu.

Next, in step 120, the Tray Menu is installed (FAQsofts menu system shown in FIG. 8) to provide access to other modules and areas in the FAQsoft routine. This hierarchical menu is activated when the user right clicks on the tray icon. To access the menu, the user must first be logged in.

Figure 9:
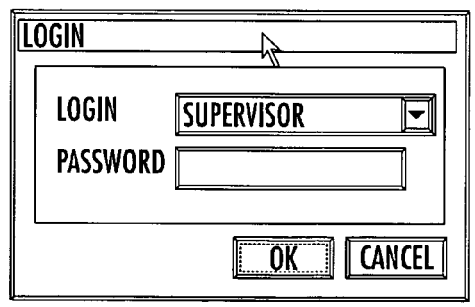
FIG. 9 shows a Login window.

The Login Dialog is shown in FIG. 9. In step 130, the FAQsoft routine first gets the User List from the database and the name of the last user from Windows Registry 28. The Windows Registry is a specialized memory area reserved by WinOS for persisting values for application settings. A Login Dialog with a dropdown list of valid users with the last User Name showing in the Login field of the Dialog is then presented in step 310.

To operate FAQsoft, there must always be a valid user logged in (step 140), since it needs to play back personalized voice recordings to the phone system, and therefore must know and prepare the current user's audio files. Upon successful login, the current user name is saved in Windows Registry in step 150, and the user's specific information (User Profile) is retrieved and loaded in step 160.

The User Profile consists of all information required to customize the FAQsoft program for that user. It includes values from the Windows Registry, such as settings for the Deskbar, location of the database and user's pre-recorded voice files and data from the FAQsoft database. This includes Configure Records, Phrase Records and Hotkeys Records necessary for execution of the FAQsoft routine. The Configure Records include information that associates Controls with one or more actions to execute (a Response). The Phrase Records define phrases to be recorded or otherwise used by each Call Agent, and contain phrase name, phrase description and file location for each phrase. The Hotkey records relate each Hotkey combination with a Response.

Figure 10:
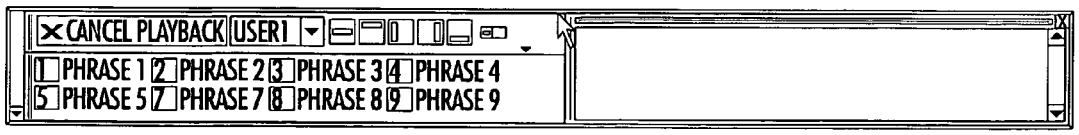
FIG. 10 shows an Appbar Application window.

In step 170 the FAQsoft Deskbar application is started and displayed as per settings from the Registry shown in FIG. 10. It contains Soft Buttons that are associated with pre-built Responses and a text area that displays the Response text from the Configure Record.

If the audio files are not available locally, the FAQsoft program will retrieve them from the Server or have the user record them first before continuing in step 180. The Phrase Manager shown in FIG. 11 will be presented if listed phrases have not been recorded. The Phrase Manager provides all necessary tools including a Sound Editor to facilitate recording and editing of phrases.

The Monitor Module 13 is then loaded in step 190. As FAQsoft's monitoring engine this makes it possible to change the behavior and appearance of selected Controls within the Target Application. The Monitor Module 13 is implemented as an ActiveX Server that runs as a faceless application in the background. It communicates with the FAQsoft's Tray Application via event messages. This module will be discussed in detailed below.

The Monitor Module 13 raises events in step 200 that are consumed by the FAQsoft Tray Application. These events become commands containing Responses for the FAQsoft Tray Application to execute. The FAQsoft Tray Application parses each Response in step 210, to determine the discrete actions required, and then executes each action sequentially until all actions contained in the Response have been executed. Valid actions supported by the current embodiment of FAQsoft include:

If action=Play (step 220), e.g., Play:Greeting, then proceed to play that Phrase (step 230).

Play the phrase using the selected PRS mechanism and continue to parse action list.

If action =Silence (step 240), e.g., Silence: 1000) then pause for specified time (number of milliseconds) (step 250) and continue to parse action list.

If action=Readback (step 26), e.g., Readback:D 445-4564B) then proceed to process the text to Readback (step 270), if recordings exist for the alpha numeric phrases.

Play the phrase using the selected PRS mechanism and continue to parse action list.

If action=Execute (step 280), e.g., Execute: ToggleDeskbar, then Execute predefined script or function specified (step 290) and continue to parse action list.

The user may access other modules in FAQsoft using the Tray Menu of the FAQsoft Tray Application. Selecting a menu item will start its corresponding module or component.

Steps 300-480 of the routine list the more significant menu items as follows:

Login step 300 loads the Login Module (step 310) that displays the Login Dialog to change user.

Figure 11:
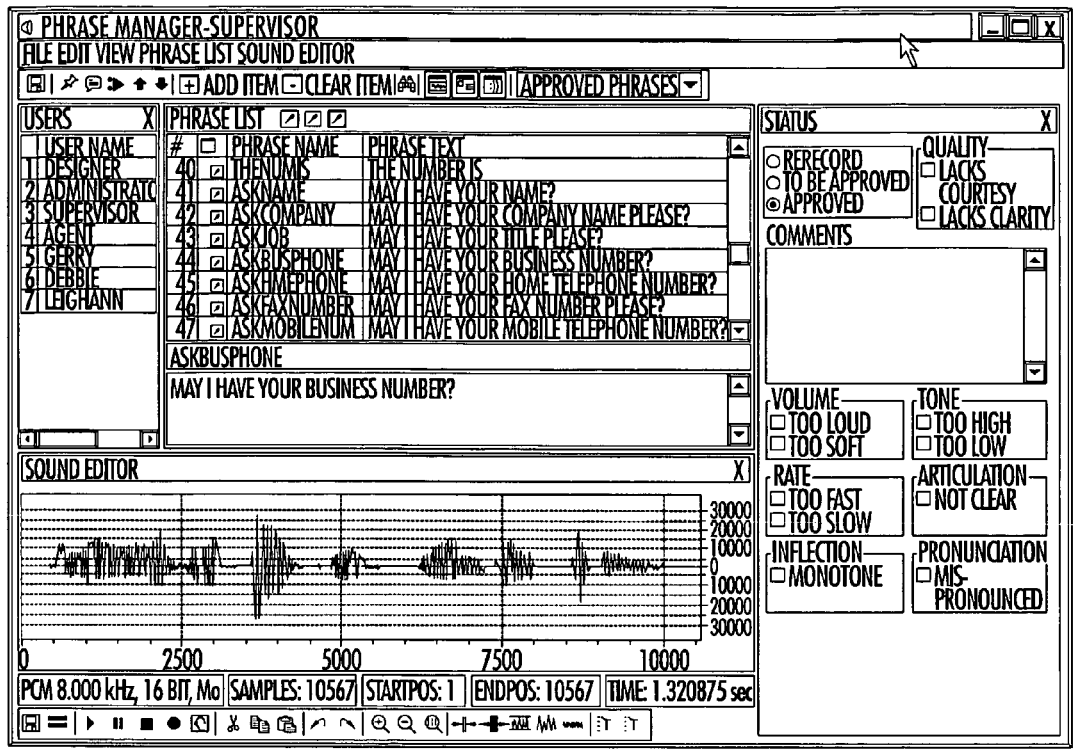
FIG. 11 shows a Phrase Manager window.

Phrase Manager step 320 loads the Phrase Manager Module (step 330) that displays the Phrase Manager Window, shown in FIG. 11. The Phrase Manager has three main functions:

1—Maintenance—including adding, deleting and editing phrase records;

2—Recording audio recording of phrases; and

3—Quality Review of recorded phrase by supervisors.

Figure 12:
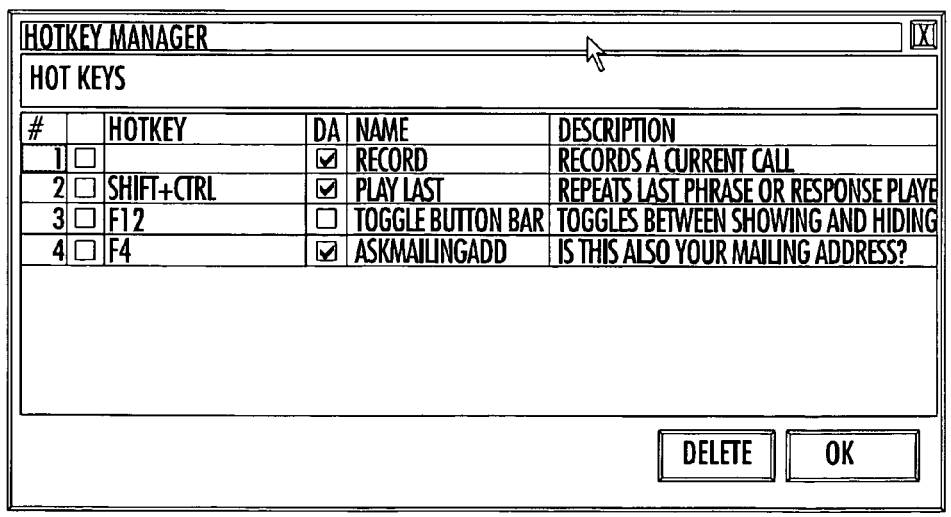
FIG. 12 shows a Hotkey Manager Window.
Figure 13:
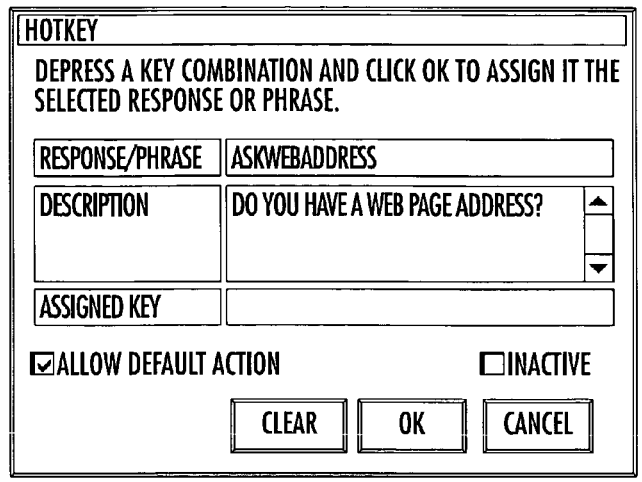
FIG. 13 is a dialog box displayed by the Hotkey Manager window.

The Hotkeys Manager step 340 loads the Hotkeys Manager Window shown in FIG. 12. The user can drag and drop Response Items from the Configure Manager into this window. The Hotkey Manager will display a dialog as shown in FIG. 13 to allow the user to designate a unique key combination tint will be used to trigger the playback of a phrase or execution or a Response. The Allow Default Action checkbox will permit pre-existing hotkeys in other applications to be executed concurrently.

Double-clicking a Hotkey item shows the Hotkey dialog for further edits. Then the gave button is click, FAQsoft persists the new Hotkey item and registers the Hotkey.

Figure 14:
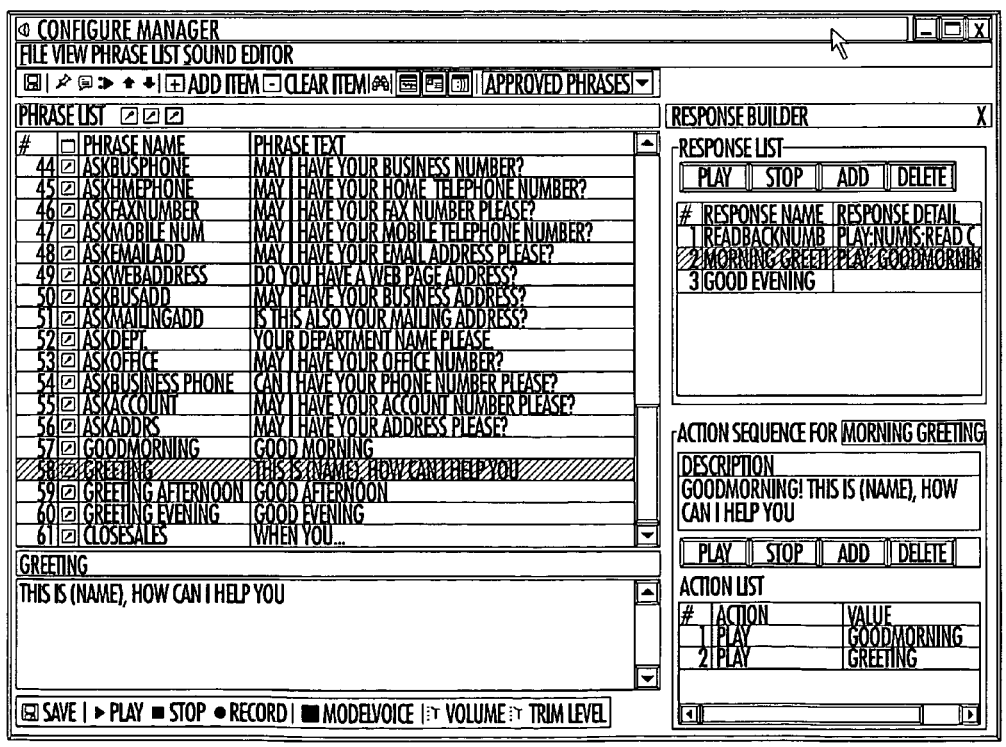
FIG. 14 shows a Configure Manager window.

The Configure Manager step 360 loads the Configure module (step 370). When started, this module displays the Configure Manager window shown in FIG. 14, which serves the following functions:

1—Changes FAQsoft to operate in Configure Mode. This mode of operation allows the selection of controls in the Target Application by using a drag and drop action from either a Phrase item or a Response item for the purpose of associating that control with the dragged item;

2—Create new Response Records. A Response Record may contain:

Concatenated phrases (a series of phrases) by dragging and dropping phrases items from the Phrase List to the Action List area;

A list of other actions by clicking on the Add button and selecting one of the available actions from the Add Actions Dialog. (See FIGS. 15-17.)

Figure 15:
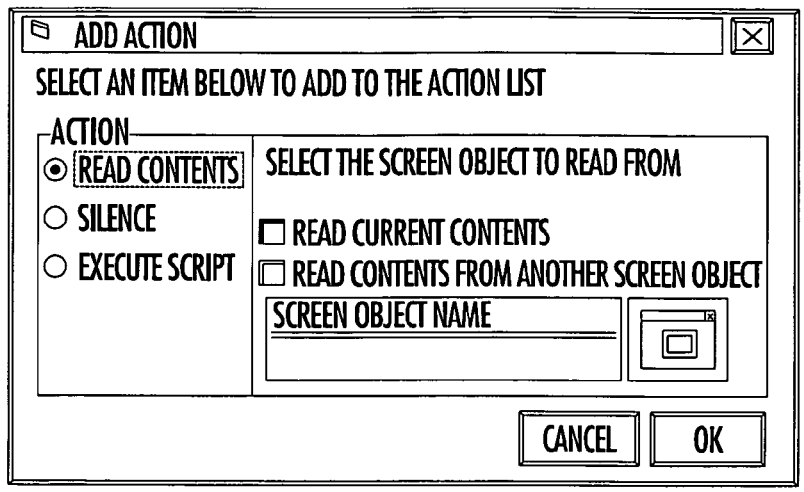
FIG. 15 shows an Add Actions Dialog—Readback Contents window.

Add Actions Dialog—Readback Contents FIG. 15: Reads back alpha numerically the text contents of the currently selected control or from another control.

Figure 16:
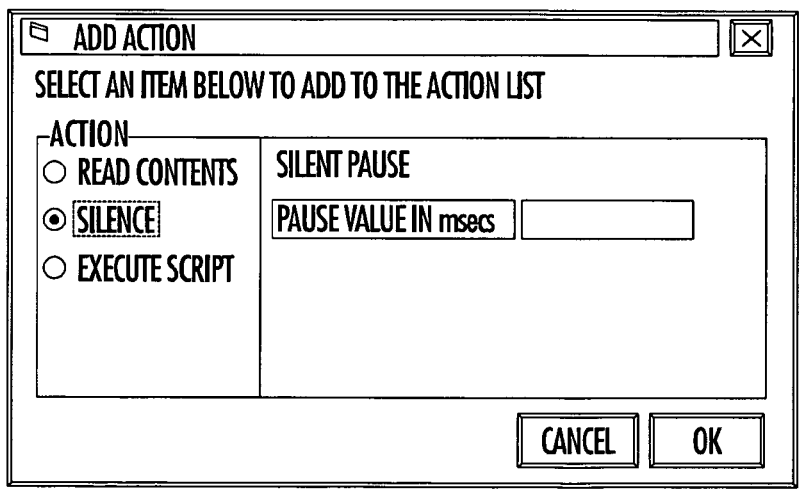
FIG. 16 shows an Add Actions Dialog—Silence window.

Add Actions Dialog—Silence FIG. 16: Pause for a duration equal to the value entered in millisecs.

Figure 17:
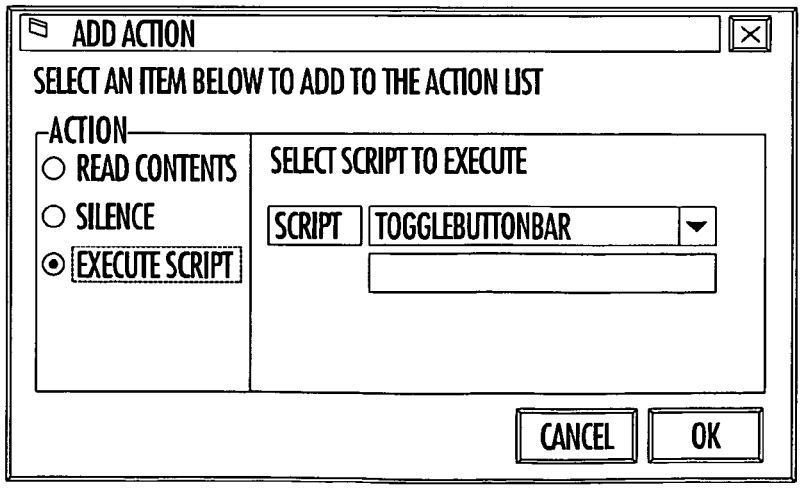
FIG. 17 shows an Add Actions Dialog—Execute script window.

Add Actions Dialog—Execute script FIG. 17: Select a script to execute from a list of pre-built scripts.

Figure 18:
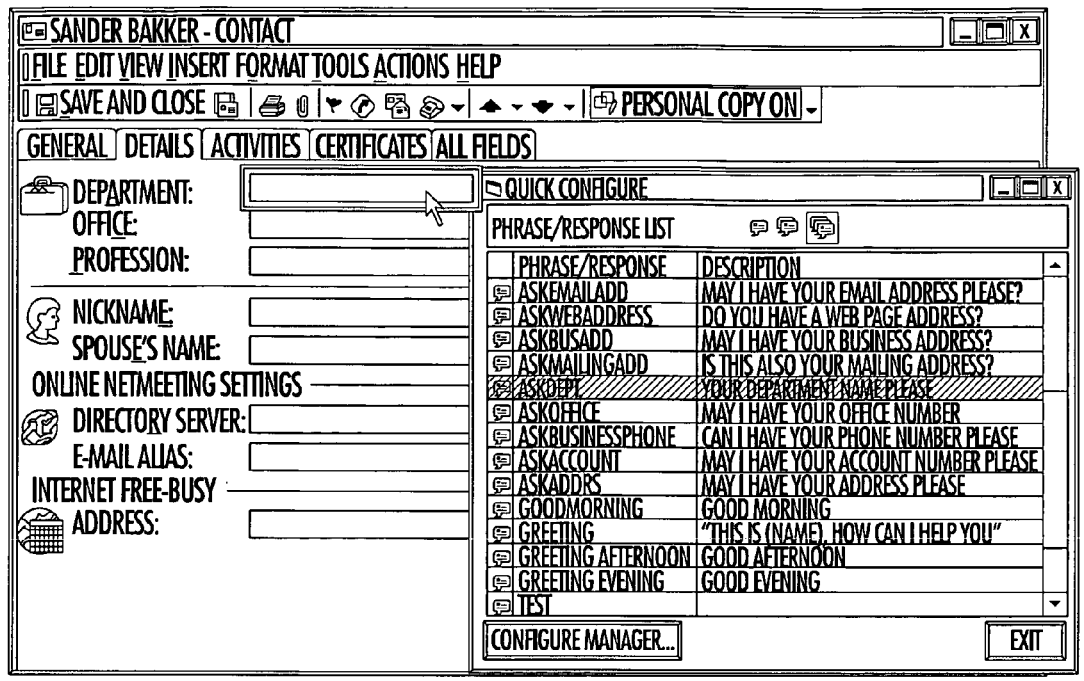
FIG. 18 shows a Phrase/Response List in a Quick Configure Window.

The Quick Configure step 380 displays the Quick Configure Window (step 390), shown in FIG. 18. This window lists the combination of Phrase items and Response items and takes up relatively little display screen area. It also causes the FAQsoft routine to operate in Configure Mode, so that the items can be dragged and dropped onto controls in Target Applications.

Figure 19:
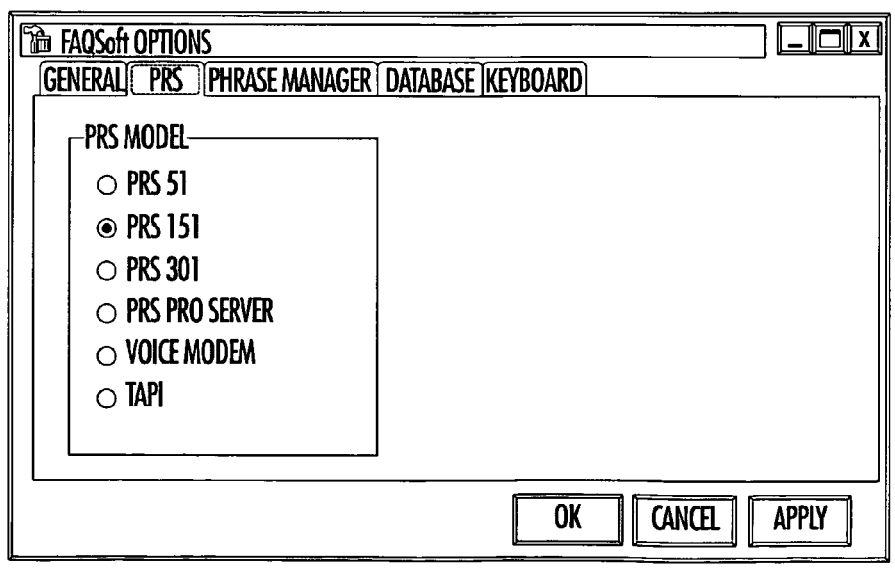
FIG. 19 is an Options Dialog window.

The Options step 400 calls the Options Dialog shown in FIG. 19 that has different tabs to define settings for the following:

1—General: Choice to use the FAQsoft Monitoring Engine or Microsoft Active Accessibility for monitoring.

2—RS: which PRS model to use.

3—Phrase Manager: Settings for default user voice file locations.

4—Database: Default location and other information related to FAQsoft's database.

5—Keyboard: Keyboard Layout Settings.

Figure 22:
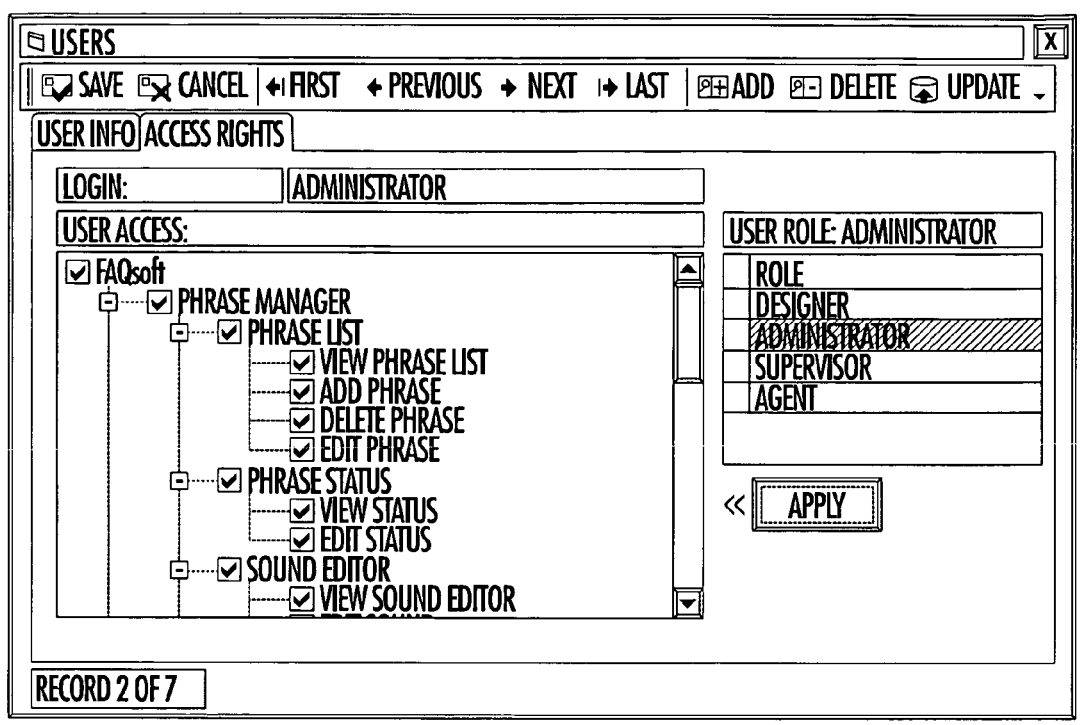
FIG. 22 shows a User Manager window with Access Rights.

The Users step 420 calls the Users module (step 430), which loads the user table from the FAQsoft Database and displays the User Manager Window shown in FIGS. 20-22. The user database stores registered users of the FAQsoft system and maintains the applications and phrases that each user is setup to use with the FAQsoft routine. It also stores the Security Rights for access to different parts of the FAQsoft routine.

The Exit step 440 saves all settings to Windows Registry (step 450), unloads instances of all modules including the Monitor component (step 460) and removes the system tray icon (step 470). The FAQsoft routine completes all necessary cleanup before quitting the tray application (step 480).

Figure 23:
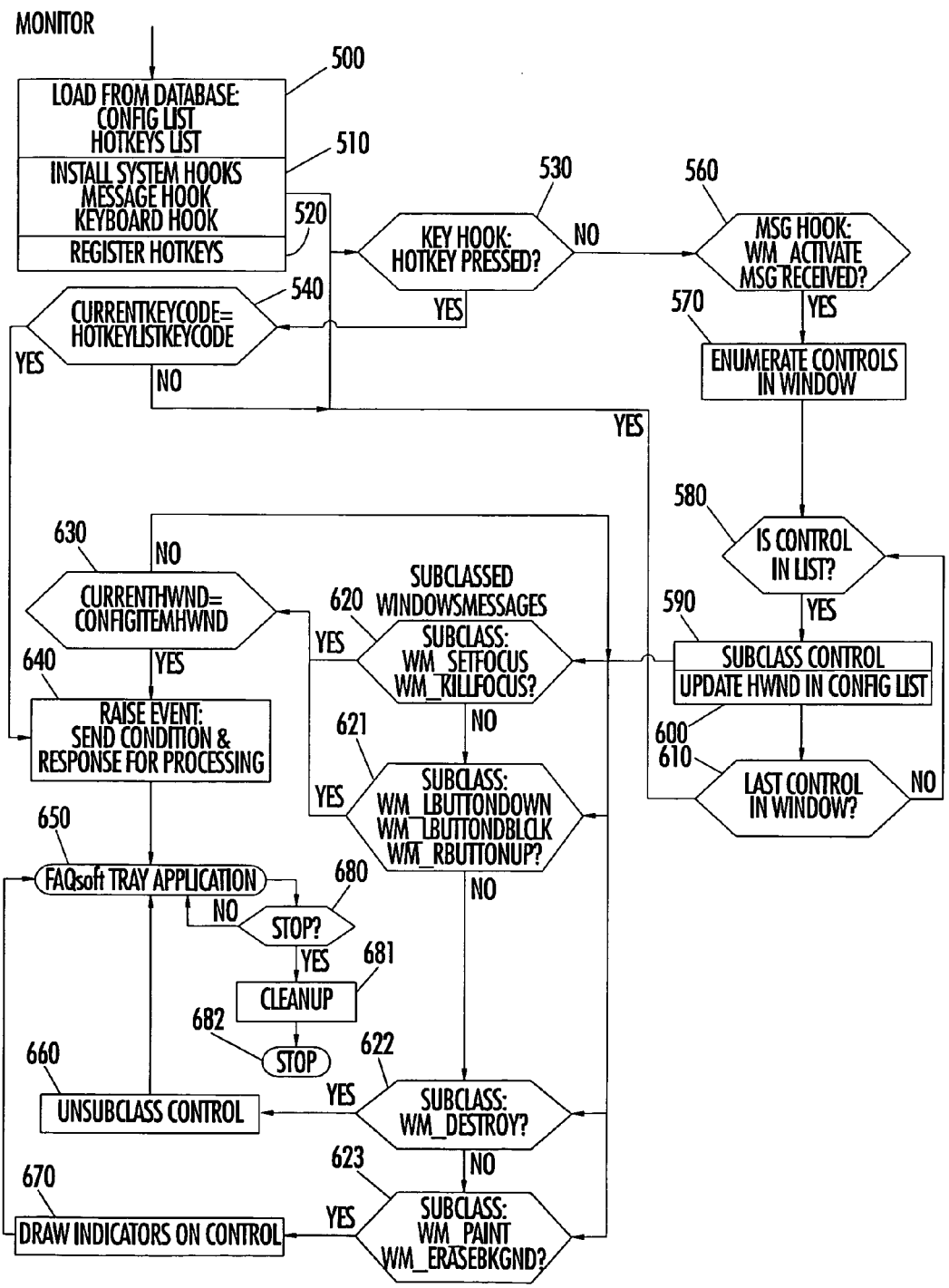
FIG. 23 is a flow chart showing the steps of the Monitor Module process flow.

FIG. 23 shows the Monitor Module process flow.

When a user logs into FAQsoft, in step 500 the Monitor component updates that users lookup tables 13 in memory consisting of Configure Records and Hotkey Records from the database 27. A specific user's Configure Records and Hotkey Records are known as the Configure List and Hotkey List.

Each Configure Record consist of the following fields:

Hwnd: The control's window handle that is dynamically updated when a control is initially found in an active Top Level Window.

Control Name: a name for a configured Control created by FAQsoft when possible by extracting text from the control or the Control's closest label.

Static Information: a collection of inherent attributes about a control that uniquely identifies it. (A detailed description is presented below.)

Event: the user action to monitor.

Condition: state of the Control or a system value to check, e.g. is the Control value=Empty?

Response: one or more actions to execute.

Response Description: A textual description of the response. This usually contains the actual script that the User is to record. This is displayed in the Deskbar when the response is executed.

The Hotkeys List also associates each defined hotkey combination in the list with a corresponding Response to execute. It contains the following fields:

Keycode: the numerical value of the key combination.

KeyCombo: the textual representation of the hotkey (e.g., Ctrl+F1).

Response: one or more actions to execute.

Response Description: A textual description of the response. It usually contains the actual script that the User is to record. This is displayed in the Deskbar when the response is executed.

In order to enable the FAQsoft routine to monitor other applications, hooks are installed (step 510) which trap Windows messages sent to these applications. These hooks are implemented as a Windows dll (Dynamic Link Library) file 12; two separate system wide books are installed using the SetWindowsHookEx function call. The Message Hook installed monitors only the WM_ACTIVATE message, in order to monitor focus changes occurring in Top Level Windows only. The Keyboard Hook is installed to implement the Hotkey function. Hotkey combinations found in the Hotkeys List are then registered in step 520. The Keyboard Hook installed traps all registered hotkey messages.

By looking at the WM_ACTIVATE message, the FAQsoft mechanism is informed whenever the user changes the active Top Level Window. When a WM_ACTIVATE message is received (step 560), FAQsoft enumerates the Controls contained within the active Top Level Window (step 570) using Win32 API call EnumChildWindows. It tries to match items in the Configure List with controls that exist within the currently active Top Level Window (step 580). If a match is found, that control is subclassed (step 590), the hwnd, field of the matching items in the Configure List (Configure Items) is updated with the control's window handle (hwnd) (step 600). User interaction with that control is monitored once it has been subclassed.

With respect to static information, the FAQsoft program extracts embedded information from a control and concatenates them to form a key that uniquely identifies each selected control (Control Static Information). This key is made up of information that remains static between multiple instances of the same Control and is generated in a similar manner as the Spy++ program found in Microsoft's Visual Studio toolset. It includes the Control's Application Name, Class Name, Class ID, Parent Name, Parent ID, Location and a few other specific characteristics of the control obtainable via Win32 API calls that require the window handle (hwnd) value of a control. A control's Static Information does not include the hwnd of the Control because this value will be different every time the Target Application creates that control.

During a previous Configuration process the same key (Static Information) would have been generated when a user selects the Control. This is stored in the Static Information field of the Configure Record. FAQsoft also attempts to supply a descriptive name for that Control and stores it in the Control Name field of the Configure Record. This name is generated differently depending on the selected Control's Class Type. For Controls with a Static Text property, such as Labels, Buttons, Dialog boxes and Icons, their embedded text is used and the control type is appended after the name. For Controls with editable text, the FAQsoft routine finds the closest label situated to the left or top of the selected control, extracts that Label's text value and appends an abbreviated control type description to the Label text to form the Control Name.

For example, if the Save button is selected, the FAQsoft routine will use the button name and postfix the control type to the name and the value Save_btn will be stored as the Control Name in the Configure Record. As another example, if the Job Title field on a form is selected, the FAQsoft routine will recognize this as an editable text control and proceed to locate the Label for that field and store Job Title_txt as the Control Name value in its Configure Record. The Configure Record's Control Name field is used as a key principally in search operations called by the User.

When a match is obtained, the FAQsoft routine updates the Configure List 13 with the current window handles after subclassing these controls so that subsequent searches will use the hwnd value instead of Static Information value. This is desirable since FAQsoft has to build the Static Information for each control before it can perform a search operation, making Static Information based searches a more expensive process. Search operations using the hwnd value are possible, since window handles are guaranteed to be unique by WinOS for the life of the Control.

As pointed out above, subclassing is a well known programming tool that is used to monitor and modify the behavior of Controls and is similar to hooking. However, subclassing is less intrusive and is targeted only at individual Windows or Controls. The hwnd (window handle) of each Control must be known before it can be subclassed.

The FAQsoft routine's subclassed Controls only monitor messages supported in the Events field of the Configure List. It traps the messages listed below to detect the following user actions. It should be observed that other messages may be added to expand the system's monitoring capabilities.

Windows Messages
  WM_DESTROY: user has closed the Top Level Window.
  WM_SETFOCUS: user has either tabbed into or clicked on the control.
  WM_KILLFOCUS: user has tabbed out of or clicked on another control.
  WM_PAINT: control requires redrawing of screen indicators.
  WM_ERASEBKGND: control requires redrawing of screen indicators.
Mouse Messages
  WM_LBUTTONDOWN: Left button single click.
  WM_LBUTTONDBLCLK: Left button double click.
  WM_RBUTTONDOWN: Right button single click.

Once a Control is subclassed, the FAQsoft routine will be aware of user interactions with that control. For example a tab into an edit box will cause the edit box to receive focus. WinOS sends a WM_SETFOCUS message to the edit box which is intercepted (via subclass mechanism) and recognized by FAQSoft as one of the monitored message (step 620). The FAQsoft routine then compares the editbox's hwnd with hwnds in the Configure List (step 630). If a match is found, the Event parameter is compared to determine a valid match and raises an event (command) for the Tray Application to consume (step 640) as illustrated by the following pseudo-code example:

'If hwnd matches then user is manipulating a monitored control
  for each  currenthwnd=ConfigItemHwnd  if
currentEvent=ConfigItemEvent  then
currentControlText=read text contents of current control if any
  RaiseEvent (currentControlText, ConfigItemResponse)
  Exit For
  end if next.

The Tray Application (step 650) executes the Response if the Condition parameter is met (step 201). It operates as a separate thread so as not to impede the Monitoring Module's performance. Other Mouse messages received from monitored Controls are treated similarly (step 621).

When a WM_DESTROY message is received (step 622), it means that the Control is being closed by the Target Application and the subclass for that control must be removed. FAQsoft removes the subclass as the destroy message is received from each Control (step 660) and resets the hwnd value to zero for related Configure items in the Configure List.

The WM_PAINT or WM_ERASE message is received (step 623) whenever repainting is require for that control. The FAQsoft routine will draw screen markers on the control in step 670 to indicate to the user actions that will cause the FAQsoft routine to respond (additional behavior for that Control). As a non-limiting example red geometrical shapes painted on different locations on the control may be used to indicate the different events to which the Control has been configured to respond. The following table lists the shape and events relationship:

| Screen Indicator | Events or user action |
| --- | --- |
| Top Left triangle | On receive focus |
| Top Right Triangle | On leave focus |
| One pixel border | On Single click |
| Two pixel border | On Double-Click |

Figures 24, 25:
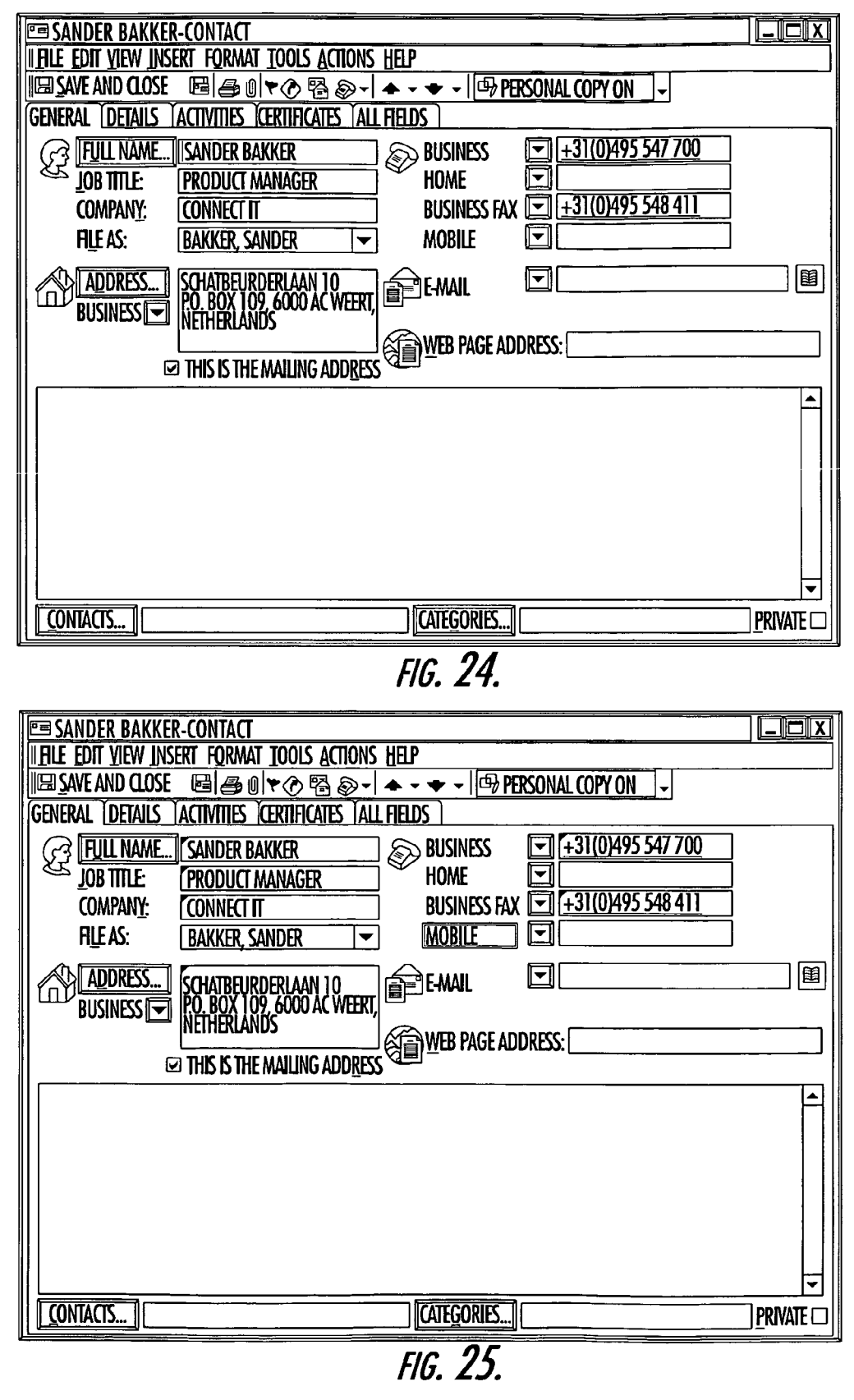

FIG. 24 shows a normal Outlook Contact window before running the FAQsoft routine and FIG. 25 shows the same window after being configured with FAQsoft and with FAQsoft running. The screen indicators provide a visual cue for the Call Agent to anticipate certain behavior when he or she interacts with FAQsoft's enhanced Controls in the Target application.

It is possible to painting controls in the Target Application's window since the Device Context (dc) can be obtained for each control in question, adding graphics to it using conventional drawing techniques. With proper graphic resource management, the user will not perceive any delay in the presentation of these screen indicators.

Hotkeys

Hotkeys are registered, so that the keyboard hook will receive an indication (message) in step 530, when a registered key combination is depressed. Upon receipt of a hotkey press, the key code value is compared to Keycodes in the Hotkeys List in memory (step 540). When a match occurs, an event is raised (step 640) and the associated Response is sent to the Tray Application for execution.

When the Monitor Module receives an Exit message from the Tray Application (step 680), it goes through a clean up process (step 681). It un-register all hotkeys, unsubclass any controls that may be still be subclassed and removes any hooks before exiting (step 682).

Control Configuration

Figure 26:
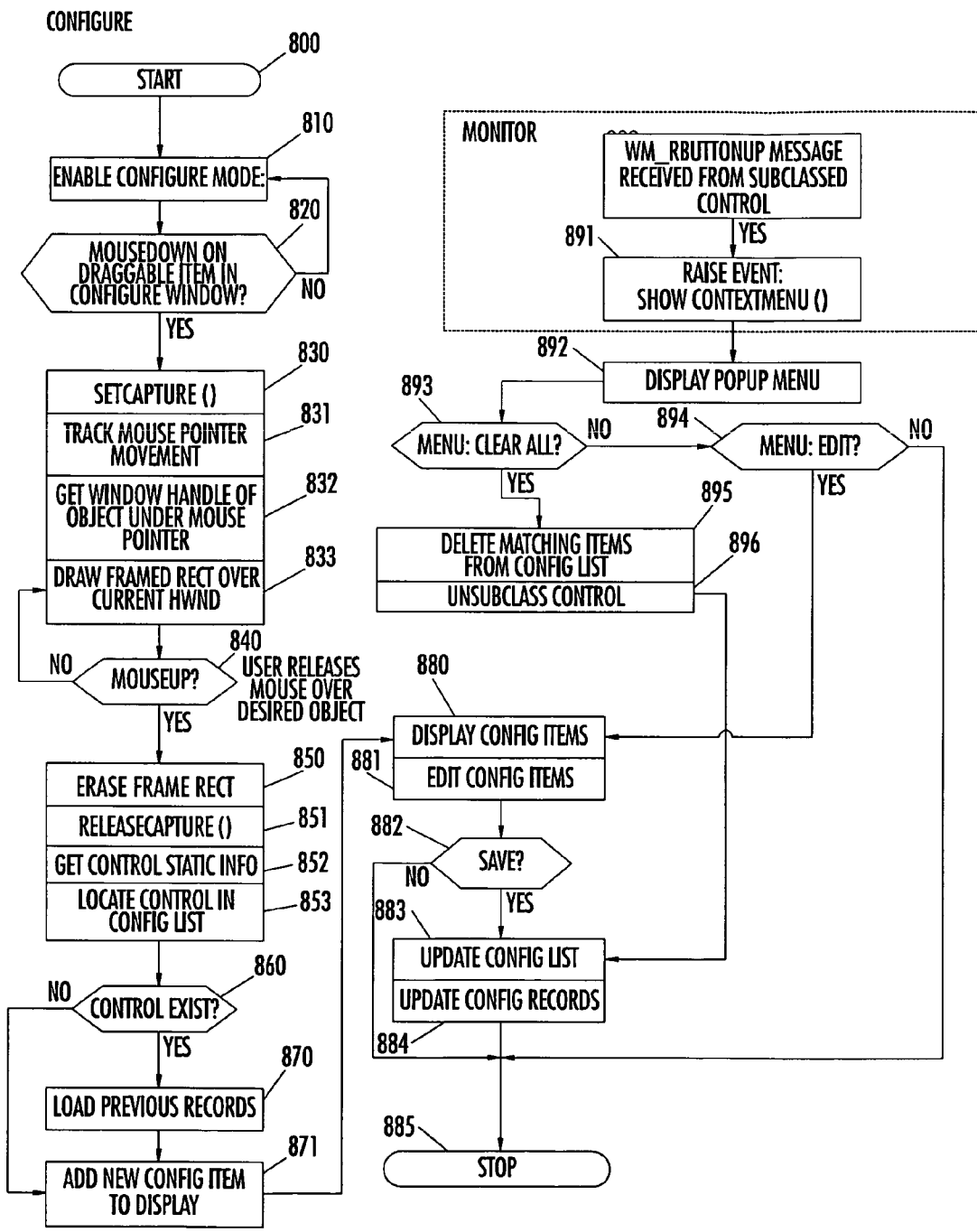
FIG. 26 shows the process sequence when FAQsoft is in Configure Mode.

The FAQsoft routine operates in Configure Mode (Design Mode) whenever the Configure Manager (FIG. 14 or Quick Configure FIG. 18) window is displayed. The Configure Mode is a state in FAQsoft where selecting and associating Response records to Controls is conducted. FIG. 26 shows the process sequence when FAQsoft is in Configure Mode.

When Configure Mode is enabled in step 810, the user is able to click and drag Phrase and Response items from their respective lists and drop them onto Controls in Target Application windows. Phrase items dropped on controls automatically generates a Response Record with the value Play: <phraseName>. When the user clicks on either a Phrase or Respones item, a MouseDown event (step 820) on the List (grid Control) that host these items (FIGS. FIG. 14 and FIG. 18) triggers a setcapture API call (step 830), which causes the mouse pointer to be tracked across the screen (step 831). A timer is used to periodically call GetWindowFromPoint( ) to get the window handle (hwnd) of the Control below the mouse pointer (step 832) and highlight the Control under the mouse.

The control's bounding rectangle is obtained with a call to GetWindowRect( ) once the hwnd is found and a yellow border drawn (FIG. 18) on this rectangle (step 833) to indicate to the user the currently selected control (highlighted control). When the mouse pointer moves over to another Control, the framed yellow rectangle is erased from the old Control and drawn over the new control. The process continues until the user releases the mouse button.

Figure 27:
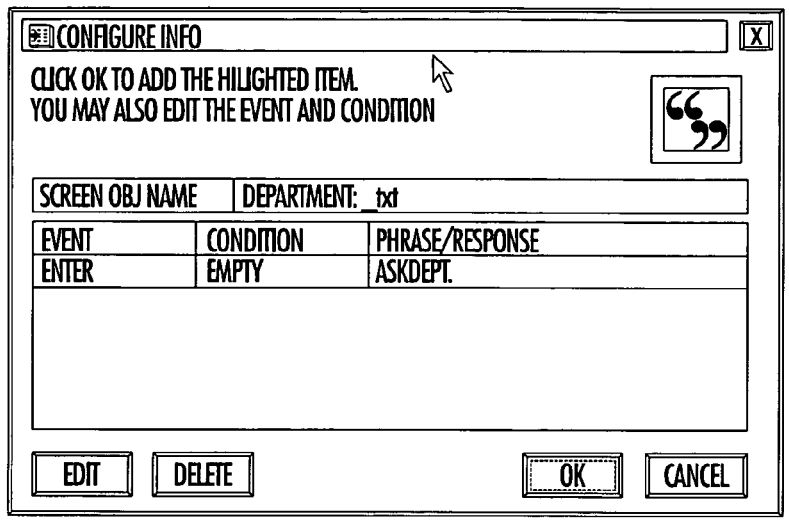
FIG. 27 shows a Configure Info Dialog window.

When the user releases the mouse button, it generates a MouseUp event (step 840). The FAQsoft routine then erases the highlighted rectangle in step 850, and calls ReleaseCapture( ) in step 851, to stop mouse pointer tracking. The control's Static Information is obtained in step 852, and matched against the same Configure List in Monitor module (step 853). If the selected control already exist (screen indicator present) in the Configure List, then all Configure Items associated with that control are recalled (step 870). These items are then displayed in step 880, together with a newly created Configure Item (step 871) to reflect the latest addition in the Configure Info Dialog window (FIG. 27).

Figure 28:
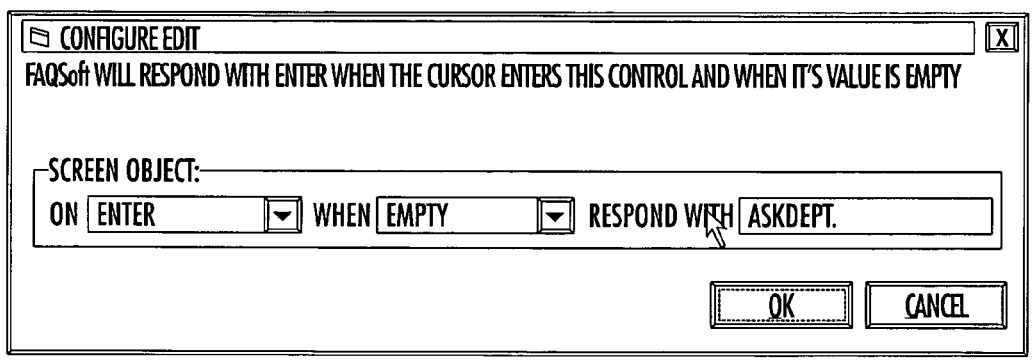
FIG. 28 shows a Configure Edit window.

The FAQsoft routine examines the Event and Condition values of the existing Configure items to try and select the next most logical Event/Condition combination for the newly created Configure Item. Each control can only accept unique Event/Condition combined values. For example, if a control is already configured with the following record:

ControlName =CreditCard#_txt
Event=OnEnter
Condition=Empty
Response=AskCardNumber And the user drags in a Response Item called VerifyCardNumber into the same Control, the FAQsoft routine will automatically fill the Condition and Event fields with the following values for the new Configure Item:

ControlName=CreditCard $\#_{13}$ txt——>CreditCard #_txt
Event=OnEnter——>OnLeave
Condition =Empty——>Not Empty
Response=AskcardNumber——>VerifycardNumber The FAQsoft routine assumes the user will want to have the second Response item triggered when the user leaves the CreditCard field (OnLeave), and only when there is some value typed into that field (Empty). The user may change these values by either double-clicking on the item or selecting an item and clicking on the Edit button (step 881), which opens the Configure Edit window (FIG. 28).

The FAQsoft routine allows the Event and Condition values to be changed, as long each item's Event and Condition combined value remains unique for each Control.

When the user exits the Configure Dialog with the Save button, the FAQsoft routine updates the current Configure List (step 883) and maintains all changes made to the Database 27 (step 884). If the user exits by clicking on the Cancel button, then no change to the Configure List Database or control is made.

Figure 29:
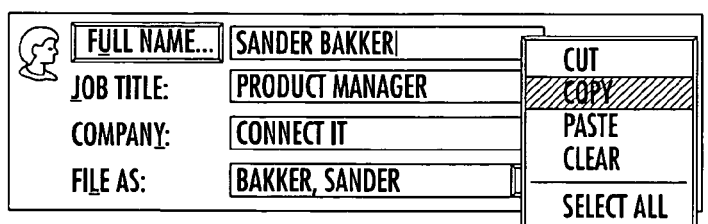
FIG. 29 shows an original context menu on a monitored text box.
Figure 30:
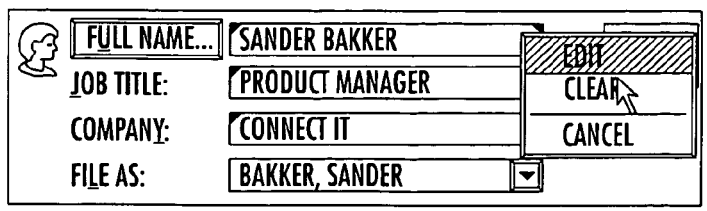
FIG. 30 shows a substituted context menu on a monitored text box.

The FAQsoft routine uses the Monitor module to help make it aware of Controls already configured within Target Applications. When the user right-clicks on a monitored control while FAQsoft is in Configure Mode, the Controls context menu is substituted with one supplied by the FAQsoft routine. FIG. 29 shows the original context menu and FIG. 30 shows the substituted one. When the Monitor receives a WM_RBUTTONUP message while in Configure Mode, it raises the ShowContextMenu event (step 891), to inform the Tray Application and does not let that message go to the intended Control.

Upon receiving the event, the FAQsoft routine replaces it with its own Context Menu and displays it (step 892) at the position where the click occurred. The replaced context menu contains only two items, Clear All and Edit. When the user selects Clear All menu item (step 893), all Configure items related to the clicked control will be removed from the Configure List (step 895). The Database is updated and the control subclassed (step 896) is removed. When the user selects Edit menu item, the FAQsoft routine loads the Controls Configure items and displays them in the Configure Info Dialog shown in FIG. 27.

As will be appreciated from the foregoing description, by using hooking and sub-classing techniques to respond to user interactions with predefined graphic user interface elements of an existing target application, the FAQsoft mechanism of the present invention avoids having to modify the source code of the target software. This enables the invention to provide a higher level of automation for call agents, without requiring any changes to the target application itself. As such, the invention may be readily employed by a call handling agent to automatically trigger various call handler actions, including automatic playback of pre-recorded personal response type phrases or other pre-defined actions at various instances during a call, in response to the call agent's interactions (such as via a mouse or keyboard) with a personalized response system-based, and forms-based software in the course of servicing telephone calls.

While I have shown and described an embodiment in accordance with the present invention, it is to be understood that the same is not limited thereto but is susceptible to numerous changes and modifications as known to a person skilled in the art, and I therefore do not wish to be limited to the details shown -and described herein, but intend to cover all such changes and modifications as are obvious to one of ordinary skill in the art.

What is claimed is:

1. For use by a call service facility in which a human call agent is in live voice communication with a calling or called party situated at a location other than said call agent, said call agent being equipped with and using a computer workstation, said computer workstation including a keyboard and visual display interface accessible to the call agent and coupled with a voice message storage and retrieval mechanism, said live voice communication being necessary to accomplish the primary purpose of a call, said primary purpose being the collection of information from said calling or called party that said call agent enters into a form containing a plurality of objects and displayed on said visual display interface through execution of a forms-based target application program, a method of automatically supplying one or more pre-recorded voice messages to said calling or called party, said method comprising the steps of:

(a) storing one or more pre-recorded voice messages in said voice storage and retrieval mechanism that may be played back to said calling or called party in response to a voice message selection signal applied thereto; and (b) providing a target application enhancement mechanism that is linked with and executed as an enhancement to said forms-based target application program, said target application enhancement mechanism being operative, in response to said call agent performing, in association with said live voice communication with said calling or called party, a prescribed interaction by advancing from one object to another object displayed on said visual display interface of said computer workstation by said forms-based target application program, to automatically trigger one or more actions, in addition to the one or more actions performed by said forms-based target application program in response to such prescribed interaction, including automatic generation of said voice message selection signal, so as to cause automatic playback, by said voice message storage and retrieval mechanism to said calling or called party, of one or more of said pre-recorded voice messages, or other predefined action, at one or more appropriate junctures during said call.

2. The method according to claim 1, wherein said target application enhancement mechanism is operative to automatically trigger said one or more actions, in addition to those performed as a result of execution of said forms-based target application program, without access to source code of said forms-based target application program.

3. The method according to claim 2, wherein said target application enhancement mechanism is operative to perform at least one of hooking and sub-classing actions with respect to said forms-based target application program.

4. The method according to claim 1, wherein said voice storage and retrieval mechanism is operative to automatically play back said one or more pre-recorded voice messages in the voice of said call agent, so that it appears to said party that said call agent is speaking said one or more prerecorded voice messages.

5. The method according to claim 1, wherein said prescribed interaction performed by said call agent with said one or more selected objects displayed on said display interface of said computer workstation by said forms-based target application program includes manipulation of a selected object on said visual display interface.

6. The method according to claim 1, wherein said target application enhancement mechanism is operative, in response to said call agent performing said prescribed interaction with one or more selected objects displayed by said visual display interface, to cause said voice message storage and retrieval mechanism to play back respectively different voice messages requesting said calling or called party to supply respectively different information components associated with said one or more selected objects.

7. The method according to claim 1, wherein said target application enhancement mechanism is operative to cause said visual display interface to display a text message associated with the playback of said one or more selected voice messages to said calling or called party.

8. The method according to claim 1, wherein said target application enhancement mechanism is operative to modify the appearance of a selected object with which a voice message to be played back to said calling or called party is associated, on said visual display interface.

9. The method according to claim 1, wherein said target application enhancement mechanism is operative to cause said visual display interface to modify a text message displayed thereby.

10. The method according to claim 1, wherein said voice message is effective to cause said party to voice information that is subsequently entered by said call agent into one or more fields of said form displayed on said visual display interface of said computer workstation.

11. The method according to claim 1, wherein said target application enhancement mechanism is operative to cause said visual display interface to display an object in addition to objects displayed thereby as a result of execution of said forms-based target application program.

12. The method according to claim 1, wherein said target application enhancement mechanism is operative to modify the appearance of one or more selected objects displayed on said display interface of said computer workstation by said forms-based target application program.

13. An apparatus for supplying one or more voice messages for collection of information into an enhanced forms-based target application program, said apparatus for use by a human call agent in a call service facility who is in live voice communication with a calling or called party situated at a location other than said call agent, said call agent being equipped with and using a computer workstation, said computer workstation including a keyboard and visual display interface accessible to the call agent and coupled with a voice message storage and retrieval mechanism, said live voice communication being necessary to accomplish the primary purpose of a call, said primary purpose being the collection of information from said calling or called party that said call agent enters into a form containing a plurality of objects and displayed on said visual display interface through execution of a forms-based target application program, said apparatus being operative to automatically supply one or more voice messages to said calling or called party, and comprising:

a signal generator that is operative to generate a voice message selection signal for causing one or more pre-recorded voice messages stored in said voice storage and retrieval mechanism to be played back to said calling or called party; and a target application enhancement mechanism that is linked with and executed as an enhancement to said forms-based target application program, said target application enhancement mechanism being operative, in response to said call agent performing, in association with said live voice communication with said calling or called party, a prescribed interaction by advancing from one object to another object displayed on said visual display interface of said computer workstation by said forms-based target application program, to automatically trigger one or more actions, in addition to those performed by said forms-based target application program in response to such prescribed interaction, including automatic generation of said voice message selection signal by said signal generator, so as to cause automatic playback, by said voice message storage and retrieval mechanism to said calling or called party, of one or more of said pre-recorded voice messages, or other pre-defined action, at one or more appropriate junctures during said call.

14. The apparatus according to claim 13, wherein said target application enhancement mechanism is operative to automatically trigger said one or more actions, in addition to those performed as a result of execution of said forms-based target application program, without access to source code of said forms-based target application program.

15. The apparatus according to claim 14, wherein said target application enhancement mechanism is operative to perform at least one of hooking and sub-classing actions with respect to said forms-based target application program.

16. The apparatus according to claim 13, wherein said voice storage and retrieval mechanism is operative to automatically play back said one or more pre-recorded voice messages in the voice of said call agent, so that it appears to said calling or called party that said call agent is speaking said one or more pre-recorded voice messages.

17. The apparatus according to claim 13, wherein said prescribed interaction performed by said call agent with said one or more selected objects displayed on said display interface of said computer workstation by said forms-based target application program includes manipulation of the appearance of a selected object on said visual display interface.

18. The apparatus according to claim 13, wherein said target application enhancement mechanism is operative, in response to said call agent performing said prescribed interaction with one or more selected objects displayed by said visual display interface, to cause said voice message storage and retrieval mechanism to play back respectively different voice messages requesting said calling or called party to supply respectively different information components associated with said one or more selected objects.

19. The apparatus according to claim 13, wherein said target application enhancement mechanism is operative to cause said visual display interface to display a text message associated with the playback of said one or more selected voice messages to said party.

20. The apparatus according to claim 13, wherein said target application enhancement mechanism is operative to modify the appearance of a selected object with which a voice message to be played back to said party is associated, on said visual display interface.

21. The apparatus according to claim 13, wherein said target application enhancement mechanism is operative to cause said visual display interface to modify a text message displayed thereby.

22. The apparatus according to claim 13, wherein said voice message is effective to cause said calling or called party to voice information that is subsequently entered by said call agent into one or more fields of said form displayed on said visual display interface of said computer workstation.

23. The apparatus according to claim 13, wherein said target application enhancement mechanism is operative to cause said visual display interface to display an object in addition to objects displayed thereby as a result of execution of said forms-based target application program.

24. The apparatus according to claim 13, wherein said target application enhancement mechanism is operative to modify the appearance of one or more selected objects displayed on said display interface of said computer workstation by said forms-based target application program.

25. An improvement to a computer workstation of a human call agent in a call service facility, in which said call agent is in live voice communication with a calling or called party situated at a location other than said facility, said call agent being equipped with and using said computer workstation, said computer workstation including a keyboard and visual display interface accessible to the call agent and coupled with a voice message storage and retrieval mechanism, said live voice communication being necessary to accomplish the primary purpose of a call, said primary purpose being the collection of information from said calling or called party that said call agent enters into a form containing a plurality of objects and displayed on said visual display interface through execution of a forms-based target application program, and wherein one or more pre-recorded voice messages are stored in said voice storage and retrieval mechanism for playback thereby to said calling or called party, in response to a voice message selection signal applied thereto, the improvement comprising:
  a target application enhancement mechanism that is linked with and executed as an enhancement to said forms-based target application program, said target application enhancement mechanism being operative, in response to said call agent performing, in association with said live voice communication with said calling or called party, a prescribed interaction by advancing from one object to another object displayed on said visual display interface of said computer workstation by said forms-based target application program, to automatically trigger one or more actions, in addition to those performed by said forms-based target application program in response to such prescribed interaction, including automatic generation of said voice message selection signal, so as to cause automatic playback, by said voice message storage and retrieval mechanism to said calling or called party, of one or more of said pre-recorded voice messages, or other pre-defined action, at one or more appropriate junctures during said call.

26. The improvement according to claim 25, wherein said target application enhancement mechanism is operative to automatically trigger said one or more actions, in addition to those performed as a result of execution of said forms-based target application program, without access to source code of said forms-based target application program.

27. The improvement according to claim 26, wherein said target application enhancement mechanism is operative to perform at least one of hooking and sub-classing actions with respect to said forms-based target application program.

28. The improvement according to claim 25, wherein said target application enhancement mechanism is operative to cause said visual display interface to display an object in addition to objects displayed thereby as a result of execution of said forms-based target application program.

29. The improvement according to claims 25, wherein said target application enhancement mechanism is operative to modify the appearance of one or more selected objects displayed on said display interface of said computer workstation by said forms-based target application program.

* * * * *